US012555906B2

(12) United States Patent
Boin et al.

(10) Patent No.: US 12,555,906 B2
(45) Date of Patent: Feb. 17, 2026

(54) PASSIVE DIRECTIONAL RF ANTENNA SCANNABLE IN ONE OR TWO DIMENSIONS

(71) Applicant: THALES, Courbevoie (FR)

(72) Inventors: Bertrand Boin, Gennevilliers (FR); Agnès Lesure, Gennevilliers (FR); Eric Privat, Gennevilliers (FR)

(73) Assignee: THALES, Courbevoie (FR)

( * ) Notice: Subject to any disclaimer, the term of this patent is extended or adjusted under 35 U.S.C. 154(b) by 379 days.

(21) Appl. No.: 18/088,714

(22) Filed: Dec. 26, 2022

(65) Prior Publication Data

US 2023/0208031 A1 Jun. 29, 2023

(30) Foreign Application Priority Data

Dec. 29, 2021 (FR) ...................................... 2114610

(51) Int. Cl.
*H01Q 3/44* (2006.01)
*H01Q 13/10* (2006.01)

(52) U.S. Cl.
CPC ............. *H01Q 3/44* (2013.01); *H01Q 13/106* (2013.01)

(58) Field of Classification Search
CPC .......... H01Q 13/02; H01Q 21/00; H01Q 3/06; H01Q 3/08; H01P 1/18; H01P 3/12
See application file for complete search history.

(56) References Cited

U.S. PATENT DOCUMENTS

| | | | |
|---|---|---|---|
| 2,602,893 | A | 7/1952 | Ratliff |
| 9,413,073 | B2 | 8/2016 | Milroy et al. |
| 2021/0075118 | A1 | 3/2021 | Goussetis et al. |

FOREIGN PATENT DOCUMENTS

| | | | |
|---|---|---|---|
| EP | 3 487 003 | A1 | 5/2019 |
| EP | 4 142 044 | A1 | 3/2023 |
| FR | 2 109 055 | A5 | 5/1972 |
| FR | 3 126 553 | A1 | 3/2023 |
| JP | H6-82969 | B2 | 10/1994 |

OTHER PUBLICATIONS

Berenguer, et al., "A Frequency-Dependent Equivalence Between Groove Gap Waveguide and Rectangular Waveguide", 2016 IEEE International Symposium on Antennas and Propagation (APSURSI), 2016.

*Primary Examiner* — Graham P Smith
(74) *Attorney, Agent, or Firm* — BakerHostetler

(57) ABSTRACT

A directional antenna array, to a radio-frequency antenna that includes one or more directional arrays and that is directional in one or two dimensions, and to a method for pointing the radio-frequency antenna and the associated computer program product. The directional antenna array comprises: a rectangular waveguide extending along a longitudinal axis, and comprising: a fixed portion with two lateral faces and an upper face, and a bottom part; a plurality of radiating elements placed on the fixed portion of the waveguide. The bottom part of the rectangular waveguide is movable translationally in a direction of movement parallel to the lateral faces, the maximum distance between the bottom part and the upper face being smaller than the distance between the lateral faces.

8 Claims, 6 Drawing Sheets

PASSIVE DIRECTIONAL RF ANTENNA SCANNABLE IN ONE OR TWO DIMENSIONS

CROSS-REFERENCE TO RELATED APPLICATION

This application claims priority to foreign French patent application No. FR 2114610, filed on Dec. 29, 2021, the disclosure of which is incorporated by reference in its entirety.

FIELD OF THE INVENTION

The invention relates to the field of antennas, and more particularly directional antennas. It is in particular applicable to antennas operating in the microwave frequency band extending between 300 MHz and 300 GHz, but may be applied to any frequency band in which electromagnetic waves may be transmitted by waveguides.

BACKGROUND

In order to maximize the link budget of radio-frequency communications, or to make a link more selective spatially, it is common to use directional antennas, which allow the antenna, or its axis of maximum radiation, to be precisely oriented in the desired direction, often without moving the antenna.

To do this, the commonest solution consists in using passive electronically scanned arrays (PESAs) or active electronically scanned arrays (AESAs), which allow the beam of radiation of the antenna to be directed without mechanical intervention. These solutions are however complex to implement, both in terms of hardware and in terms of software. Specifically, the principle is to use one phase-shifting element per unit antenna of the array, and as a result it is possible to rapidly end up with thousands of phase shifters to be controlled simultaneously. These antennas are therefore complex to implement and expensive.

Another family of scannable antennas includes "quasi-optical" devices, these being based on transmission (lenses) or reflection (mirrors), and the position of the source of which is varied to direct the beam of the antenna. However, these devices are often bulky (lenses, mirrors or the like) and not very effective.

Other types of devices are known, such as for example the VICTS device (VICTS standing for variable inclination continuous transverse stub) described in the U.S. Pat. No. 9,413,073 B2. It uses rotation of two superposed plates each playing the role of "prism" deviating the beam azimuthally and elevation wise. However, although the lens thickness of this device is small with respect to quasi-optical devices, it remains bulky. Furthermore, VICTS devices based on rotation allow only circular antennas to be addressed.

Generally, devices based on rotation address only circular antennas, whereas devices not based on rotation in general require substantial movement of the radio-frequency (RF) source with respect to the focusing system (mirror, lens), this resulting in problems with junctions, losses, etc.

Antennas such as slot arrays, which comprise a waveguide on which are placed a plurality of radiating elements, generally slots, are also known in the prior art. The wave propagating through the guide is transmitted by each of the slots, with a phase shift that depends on the spacing between the radiating elements and on the wavelength guided. The direction of the beam of such an antenna may therefore be changed by modifying the wavelength of the signal propagating through the guide. However, such a modification generally involves a modification of frequency, this generally being incompatible with the rest of the radio chain the frequency of which is dictated by other constraints.

SUMMARY OF THE INVENTION

One objective of the invention is therefore to provide a simple antenna system allowing an array of N phased-array antennas to be controlled without recourse to N "electronic" phase shifters (i.e. ones fed electrically and controlled independently), and without recourse to optical or quasi-optical systems.

To this end, the present invention describes a directional antenna array, comprising:

- a rectangular waveguide with two feeds, the guide extending along a longitudinal axis Oy, said rectangular waveguide comprising:
  - a fixed portion with two lateral faces facing each other and an upper face joining the two lateral faces orthogonally, and
  - a bottom part placed between the two lateral faces, the bottom part forming the lower face of the waveguide;
- a plurality of radiating elements placed regularly along said longitudinal axis on the fixed portion of the waveguide, In the directional antenna array according to the invention, the bottom part of the rectangular waveguide is movable translationally in a direction of movement Oz parallel to the lateral faces, the maximum distance between the bottom part and the upper face being smaller than the distance between the lateral faces.

In one embodiment of the invention, the bottom part comprises a core extending along the longitudinal axis Oy. It further comprises at least a first row of bars respectively extending from the core in a direction Ox perpendicular to the longitudinal axis Oy and to the direction of movement of the bottom part Oz.

The invention also relates to a directional radio-frequency antenna, comprising:

- N directional antenna arrays according to the invention, with N higher than or equal to 1,
- means for adjusting the position of the bottom part of the N directional antenna arrays, configured to adjust the position of the bottom part of the N waveguides depending on a sought-after antenna-beam direction.

In one embodiment, the directional radio-frequency antenna according to the invention comprises N identical directional antenna arrays placed in parallel and aligned directions. Adjustment of the position of the bottom part of the waveguides of the N antenna arrays allows the beam of the antenna to be oriented in a plane Oyz comprising said longitudinal axis Oy and an axis Oz perpendicular to the longitudinal axis and parallel to the lateral faces of the one or more waveguides of the directional antenna array.

In another embodiment of the directional radio-frequency antenna according to the invention, in which N is higher than or equal to three, said antenna comprises N−1 identical directional antenna arrays placed in parallel and aligned directions, and a separate directional antenna array configured so that its radiating elements radiate into feeds of said N−1 directional antenna arrays. The latter antenna array is therefore used as a divider of one input and N−1 outputs (and reciprocally a combiner of one output and N−1 inputs) the phase shift of which is adjustable.

Advantageously:

the separation between the upper face and the bottom part of the waveguides of the N−1 directional antenna arrays is the same for each of these waveguides, and adjustment of the position of the bottom parts of the waveguides of the N−1 directional antenna arrays allows the beam of the antenna to be oriented in a plane Oyz comprising an axis Oy parallel to the longitudinal axis of the N−1 directional antenna arrays, and an axis Oz perpendicular to these longitudinal axes and parallel to the lateral faces of the waveguides of the N−1 directional antenna arrays;

the position of the bottom part of the waveguide of the separate directional antenna array allows the beam of the antenna to be oriented in a plane Oxz orthogonal to the longitudinal axis Oy of the N−1 directional antenna arrays.

The invention also relates to a method for configuring the pointing direction of a directional radio-frequency antenna, said radio-frequency antenna comprising:

N directional antenna arrays according to the invention, with N higher than or equal to 1, means for adjusting the position of the bottom part of the N directional antenna arrays, configured to adjust the position of the bottom part of the N waveguides depending on a sought-after antenna-beam direction.

The method comprises:

a step of computing the position of the bottom parts of the waveguides of the one or more directional antenna arrays of the directional radio-frequency antenna, and a step of modifying the position of the bottom parts of the waveguides of the one or more directional antenna arrays as computed in the first step.

Lastly, the invention relates to a computer program product comprising program-code instructions for executing the steps of the method according to the invention when said program is executed on a computer.

BRIEF DESCRIPTION OF THE DRAWINGS

The invention will be better understood and other features, details and advantages will become more clearly apparent on reading the following non-limiting description, and by virtue of the appended figures, which are given by way of example.

Identical references have been used in various figures to designate identical or comparable elements.

DETAILED DESCRIPTION

In order to address the defects of the prior art, the invention describes an antenna of slot-array type allowing the pointing direction of the beam to be guided via a mechanical action on the position of a bottom wall of the guide.

Figure 1A:
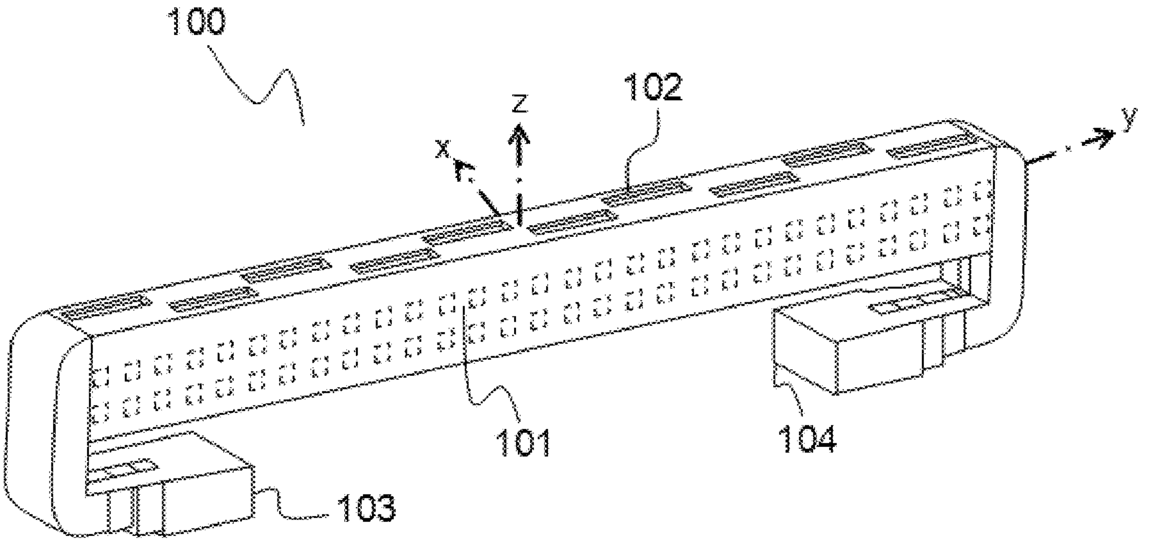
FIG. 1*a* shows a first embodiment of a passive directional antenna array according to the invention.

FIG. 1*a* shows a first embodiment of a passive directional antenna array 100 according to the invention.

It comprises a rectangular waveguide 101, configured to propagate an electromagnetic wave having a given maximum frequency. For example, the waveguide may have a waveguide width the order of magnitude of which is about half that of the guided wavelength that it transports. The waveguide 101 extends along a longitudinal axis Oy (O being the centre of the waveguide). On the waveguide are placed a plurality of radiating elements 102, regularly along the axis Oy. The waveguide comprises an input and an output, which may immaterially be the feeds 103 or 104. When the antenna is used in transmission mode, the signal to be transmitted is injected into one feed of the guide, radiated by the radiating elements as it propagates through the waveguide, and ends in the output, which is generally connected to an element, such as a load, for absorbing the residual signal. When the antenna is used in reception mode, the ambient radio-frequency signal is successively captured by the radiating elements, and propagates through the waveguide to the output of the guide, which is connected to elements allowing it to be processed (radio-frequency chain, analogue/digital converter, digital processing means, etc.).

Below, the directional antenna array according to the invention is described with reference to a transmit antenna, but is identically applicable independently of whether the antenna array is used in transmission or reception mode.

The simplest way of implementing the radiating elements 102 of the directional antenna array consists in producing slots in the waveguide. However, other embodiments are possible, for example ones using as radiating elements other types of antenna, such as patch antennas, printed dipole antennas, printed spiral antennas or the like, fed by a means allowing energy to be coupled from the guide to the radiating element, such as for example a coaxial cable embedded in the waveguide. Below, the invention will be described in the case where slots are used as radiating elements, but it may be implemented in various ways.

An electromagnetic wave propagating between the feed 103 and the feed 104 of the waveguide successively excites the various radiating elements 102. Each radiating element captures a share of the energy of the wave proportional to its area, and transmits it out of the waveguide. Two adjacent radiating elements spaced apart by a distance $\Delta y$ therefore emit the electromagnetic wave with a phase shift $\Delta\varphi$, which depends on $\Delta y$ and on the wavelength $\lambda$ of the electromagnetic wave. This phase shift allows the beam of the antenna array to be tilted along the axis Oy by an angle $\alpha$ with respect to the normal to the array such that $\Delta\varphi=2\pi\cdot\Delta y\cdot\sin(\alpha/\lambda)$.

The phase shift between two radiating elements of the passive antenna array therefore depends on the wavelength of the transmitted signal, on the shape of the slots and on their separation. The direction of the beam of the antenna depends directly on this phase shift.

This mode of operation corresponds to the prior art of antennas of slot-array type.

The invention differs from the prior art in that the waveguide comprises a fixed portion, comprising the upper face and the two sides of the waveguide, and a bottom part that is translationally moveable between the two sides, so that the height of the cavity located inside the waveguide may be adjusted without modifying the width of the guide, and therefore without modifying its cutoff frequency. The moveable bottom part forms the lower face, or bottom wall, of the waveguide.

In the embodiments shown in the figures, the radiating elements are positioned on the upper face of the waveguide. Alternatively, they may be positioned on one of the sides of the waveguide, or on both sides.

Figure 1B:
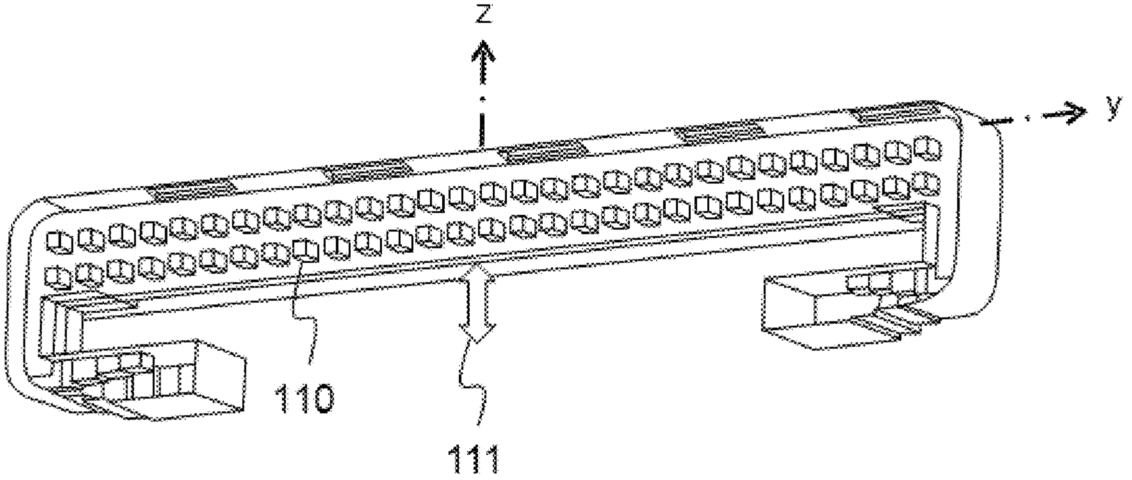
FIG. 1*b* is a representation of the interior of the antenna array of FIG. 1*a;*

FIG. 1*b* is a representation of the interior of the antenna array of FIG. 1*a*. The bottom part 110 of the waveguide, which is translationally moveable along the axis Oz, may be seen therein. The variation in the height of the waveguide, which is obtained by modifying the position of the moveable bottom part, modifies the electromagnetic wavelength transiting the waveguide, and therefore the direction of radiation of the beam emitted by the antenna array.

Figure 2A:
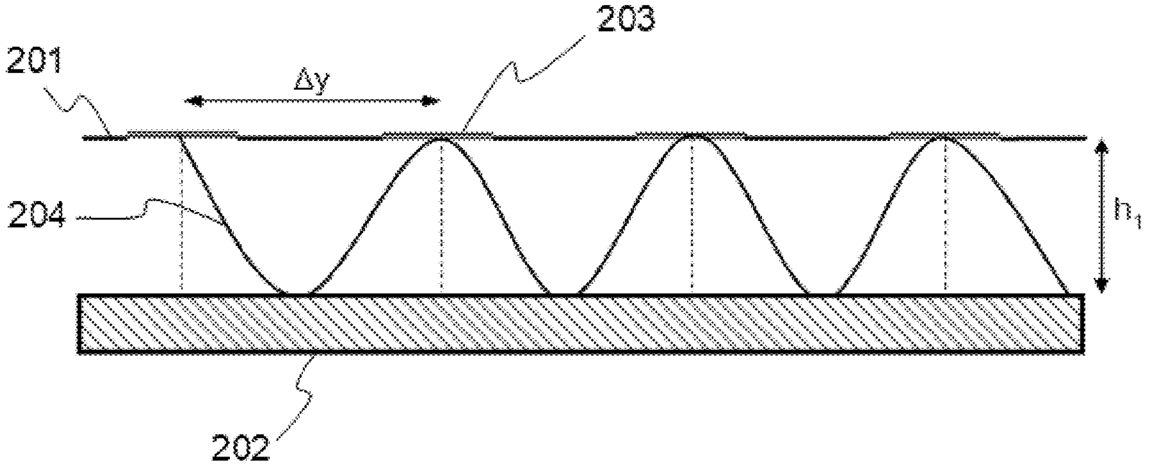
FIG. 2*a* schematically illustrates the operation of the antenna array, for a given wavelength.
Figure 2B:
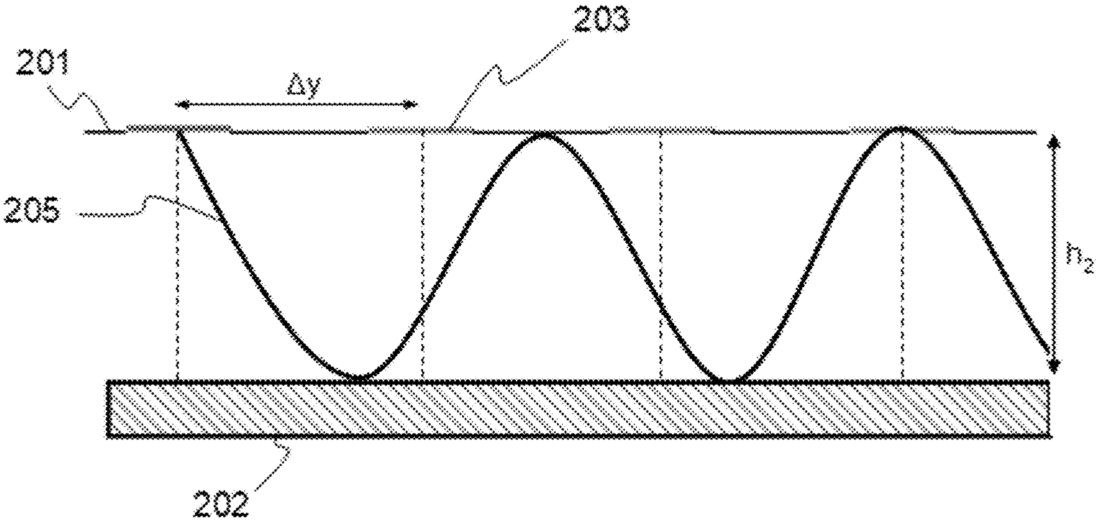
FIG. 2*b* schematically illustrates the operation of the same antenna array as in FIG. 2*a*, for another wavelength.

FIGS. 2*a* and 2*b* schematically illustrate the operation of the antenna array according to the invention.

FIG. 2*a* features the upper face 201 and the moveable bottom part 202 of the waveguide, which forms its lower face. Slots 203 are produced in the upper face, said slots functioning as radiating elements with respect to an electromagnetic wave 204 transmitted through the waveguide. The upper face and the bottom part are separated by a distance $h_1$. The electromagnetic wave propagates through the waveguide with a wavelength $\lambda_1$.

FIG. 2*b* shows the same elements, but with a distance $h_2$ larger than $h_1$ between the upper face and the bottom part. Thus, the electromagnetic wave propagates with a wavelength $\lambda_2$ larger than $\lambda_1$. In the example of FIGS. 2*a* and 2*b*, $\Delta y=\lambda_1$ and $3\Delta y=2\cdot\lambda_2$, for a given separation $\Delta y$ between the radiating elements. Modification of the position of the bottom part 202 leads to a change in the wavelength of the guided signal, this modifying the phase shift of the signals radiated by the radiating elements 203, and therefore the pointing direction of the antenna.

Figure 3A:
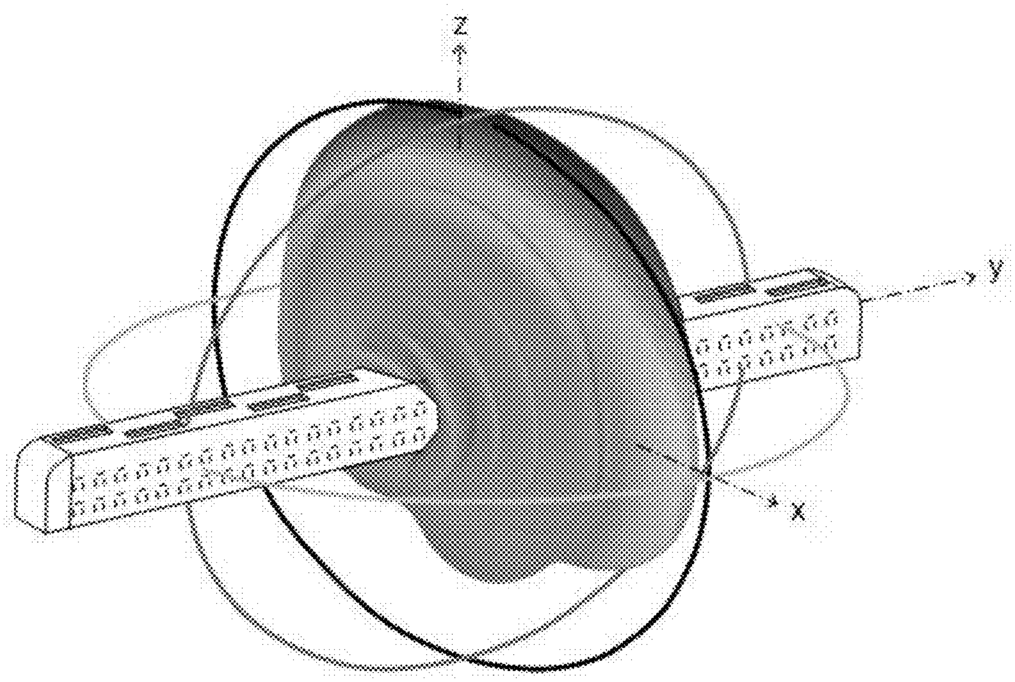
FIG. 3*a* shows the radiation pattern obtained with a directional antenna array according to one embodiment of the invention, for a given phase shift.
Figure 3B:
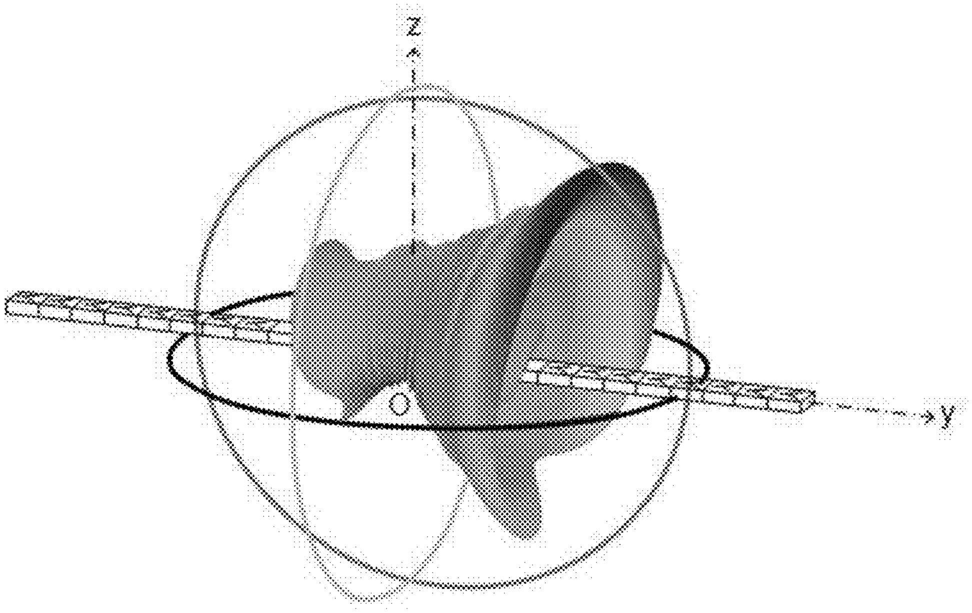
FIG. 3*b* shows the radiation pattern obtained with the same directional antenna array as in FIG. 3*a*, for another phase shift.

FIGS. 3*a* and 3*b* show radiation patterns obtained with a directional antenna array according to one embodiment of the invention. Due to modification of the position of the bottom part of the waveguide, the wavelength guided in the waveguide of FIG. 3*a* is different from the wavelength guided in the waveguide of FIG. 3*b*, and as a result the lobe of the radiation pattern in the plane Oyz, which plane comprises the longitudinal axis Oy along which the antenna array extends and the axis Oz perpendicular to this longitudinal axis and parallel to the lateral faces of the waveguide, does not have the same inclination in both figures.

Implementation of the invention requires a waveguide having a translationally moveable bottom wall to be produced. Such a waveguide (not shown) may be produced by detaching the bottom wall of a waveguide, and automatically controlling it translationally via any mechanical element. This solution however has the drawback of having to be machined very finely since the movement of the bottom wall may be subject to friction that might deform the waveguide and therefore deform the guided electromagnetic waves, and since the joints between the bottom wall and the sides must be electrically hermetic, once again in order not to deform and attenuate the electromagnetic wave that propagates through the guide.

The inventors have filed patent application FR 2109055, in which they describe a waveguide having an apertured mobile bottom part, comprising periodic features allowing the waveguide to be closed in an electrically hermetic manner without the edges touching.

Figure 4:
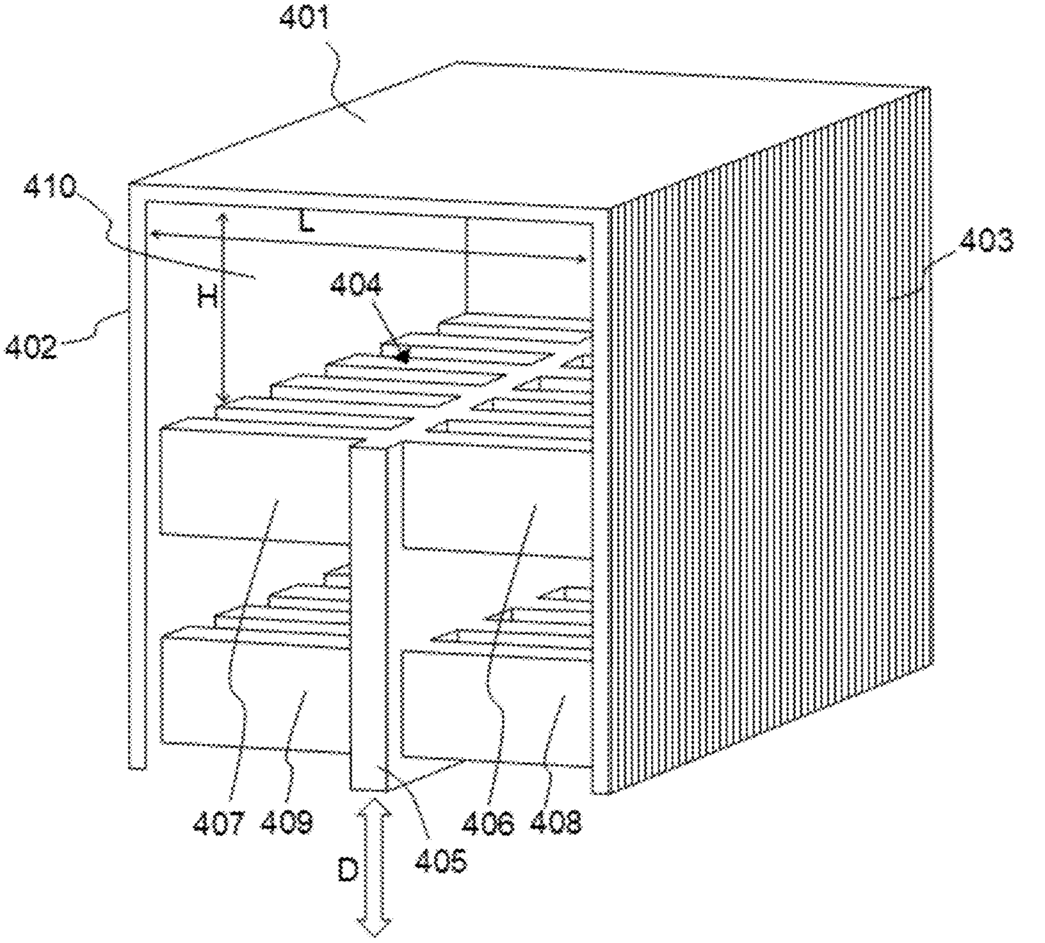
FIG. 4 shows an electromagnetic waveguide allowing the invention to be implemented.

FIG. 4 shows an electromagnetic waveguide such as described in patent application FR 2109055, and which is particularly suitable for implementation of the invention.

This waveguide of rectangular cross section comprises a fixed portion with two lateral faces 402 and 403 facing each other on the sides of the rectangle, and an upper face 401 joining the two lateral faces orthogonally. The waveguide also comprises a bottom part 404 that is translationally moveable between the two lateral faces in the direction of movement D, parallel to the lateral faces, and which forms the lower face of the guide. The upper face, the two lateral faces and the bottom part then form a duct 410 of height H and of width L, configured to guide the propagation of an electromagnetic wave through the waveguide. So as not to affect the cutoff frequency of the waveguide, this assembly is defined such that the height H is always smaller than the width L.

In one embodiment, the bottom part comprises:

- a core 405 that extends in a direction parallel to the longitudinal axis of the waveguide, and that is located midway between the lateral faces 402 and 403, with an upper edge facing the upper face of the waveguide;
- a first row of bars 406 and 407 that are regularly arranged and that extend from the upper edge of the core 405 towards the lateral faces of the waveguide in a direction parallel to the upper face 401. These bars define, with the upper edge of the core 405, the bottom part 404;
- a second row of bars 408 and 409 that are regularly arranged and that extend from the core 405 towards the lateral faces of the waveguide in a direction parallel to the upper face 401, and that are positioned under the first row of bars.

According to other embodiments, the bottom part may comprise only a single row of bars, or more than two rows of bars. The successive rows of bars may be of identical geometries and/or aligned.

According to one embodiment, the bottom part 404 or the upper face 401 of the waveguide may comprise a rib extending into the cavity 410 over the entire length of the waveguide in a direction parallel to its longitudinal axis. Such a rib allows the dimension of the waveguide with respect to the guided wavelength to be decreased.

Play is preferably allowed between the bars and the lateral faces, allowing the bottom part 404 to be moved without friction with the lateral faces 402 and 403.

The bars 406 to 408 are dimensioned as explained in the article by Antonio Berenguer, Vincent Fusco, Mariano Baquero-Escudero and Vicente E. Boria Esbert: "A frequency-dependent equivalence between groove gap waveguide and rectangular waveguide", 2016 IEEE International Symposium on Antennas and Propagation & USNC/URSI National Radio Science Meeting.

Because of its geometric properties, the bottom part forms a wall that is electrically hermetic to the electromagnetic waves transmitted by the waveguide. Since it is not necessarily tight to the lateral walls, it may be easily moved translationally between these two walls.

The assembly formed by the fixed portion and the mobile portion is made of a conductor, such as copper, brass, silver or titanium, or a plastic covered with a thin metal layer.

A means for adjusting the position of the bottom part, such as a motor, for example a stepper motor, a piezoelectric motor or a coil motor, controlled by a regulating device, may be configured to adjust the position of the bottom part, and therefore the height H of the duct 410 of the waveguide.

The waveguide shown in FIG. 4 is therefore particularly suitable for implementation of an array antenna according to the invention since it allows the volume of the internal cavity of the waveguide to be varied while being electrically hermetic and preventing friction with the lateral faces.

The antenna array shown in FIG. 1*a* may be used as a directional radio-frequency antenna the radiation pattern of which may be steered in a plane, i.e. a 1D RF antenna.

However, a plurality of antenna arrays according to the invention may be implemented conjointly so as to form a directional RF antenna the radiation pattern of which may be steered in two directions, i.e. a 2D RF antenna.

Figure 5A:
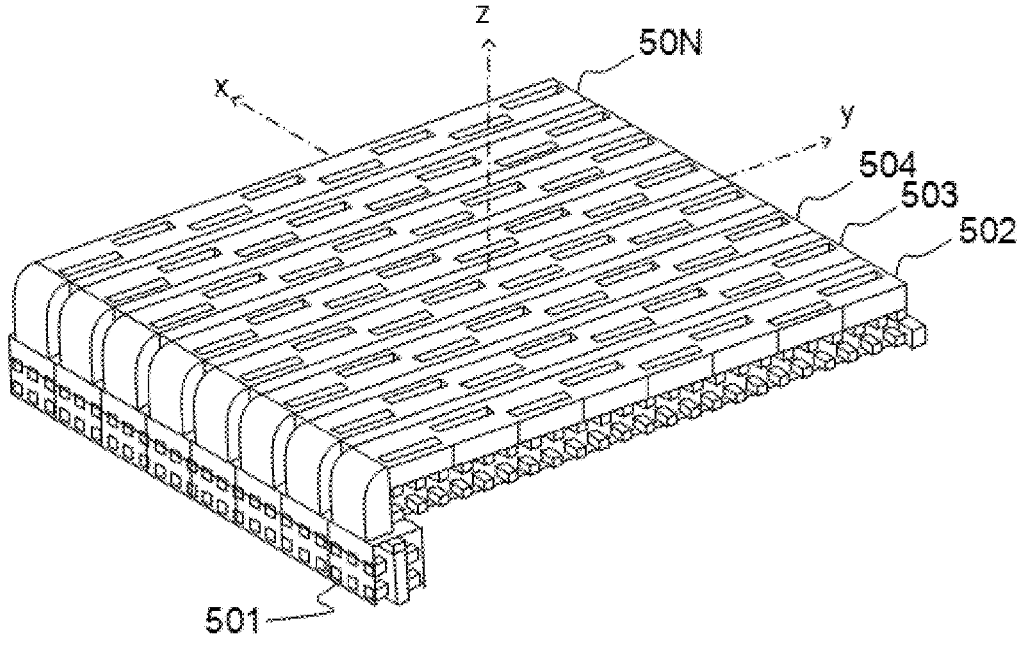
FIG. 5*a* shows one embodiment of a 2D directional RF antenna according to the invention.
Figure 5B:
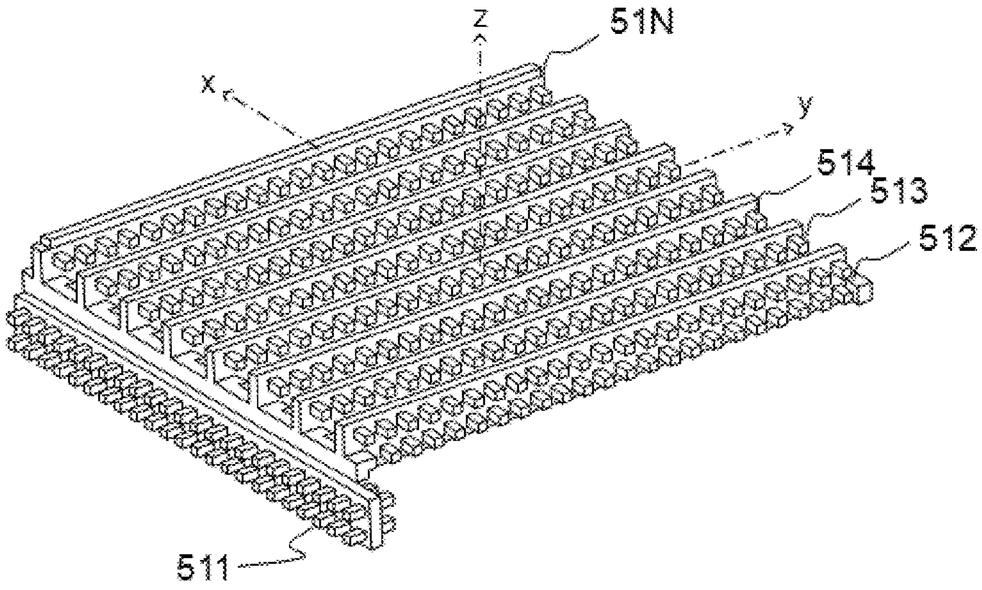
FIG. 5*b* is a representation of the interior of the 2D directional RF antenna of FIG. 5*a,*

FIGS. 5*a* and 5*b* show one embodiment of a 2D directional RF antenna according to the invention.

It comprises N antenna arrays, with N higher than or equal to three:

a first antenna array 501, and

N−1 antenna arrays 502, 503, . . . , 50N.

The N−1 directional antenna arrays 502 to 50N are identical and placed so as to form aligned parallel rows. By identical, what is meant is that the dimensions of the waveguide of these antenna arrays are equal, and that they all comprise the same number of identically spaced radiating elements.

The waveguides that form the N−1 directional antenna arrays are each arranged along a longitudinal axis parallel to the axis Oy shown in the figure, with O the centre of the array formed by the N−1 directional antenna arrays 502 to 50N.

This assembly is configured so that the radiating elements of the directional antenna array radiate into one of the feeds of the N−1 other directional antenna arrays. This may be done, for example, by placing the antenna array 501 in a direction perpendicular to the direction of the N−1 antenna arrays 502 to 50N, and by linking the slots of the array 501 with the feeds of the arrays 502 to 50N, as in FIG. 5*a*. In another embodiment, the waveguide 501 may have any orientation, the radiating elements of the waveguide 501 being linked to the feeds of the arrays 502 to 50N by coaxial links of same lengths. Other embodiments are possible.

The number of radiating elements of the antenna array 501 is equal to N−1. The length of the waveguide of the antenna array 501 and the spacing Δy' between the radiating elements of the array 501 are not necessarily equal to those of the waveguides of the arrays 502 to 50N.

FIG. 5*b* shows the moveable bottom parts of the feed arrays of FIG. 5*a*. The bottom parts 512 to 51N of the feed arrays 502 to 50N are configured so that the separation between the upper face of the waveguide and the bottom part is the same for each of these waveguides. One possible embodiment consists in synchronizing the adjusting means that ensure the translation of these bottom parts. Another embodiment consists in securely fastening these bottom parts to one another, the bottom parts being moved translationally by the same adjusting device.

The bottom part 511 of the isolated antenna array 501 is moved translationally by an adjusting means independent of that of the other antenna arrays.

Thus, an electromagnetic wave injected into a feed of the waveguide of the array 501 propagates through the waveguide, and radiates into the various feeds of the waveguides of the antenna arrays 502 to 50N with a phase shift Δφ'. It then propagates through each of the waveguides of the antenna arrays 502 to 50N, successively exciting the radiating elements with a phase shift Δφ that is identical for all the waveguides 502 to 50N.

Adjusting the height of the bottom part of the waveguides 502 to 50N therefore allows the wavelength of the wave guided inside these waveguides to be varied, and therefore the beam of the RF antenna to be oriented in a plane Oyz comprising the axis Oy passing through the centre of the array formed by the arrays 502 to 50N and parallel to the axis along which each of the arrays 502 to 50N extend, and the axis Oz perpendicular to Oy and parallel to the lateral faces of the waveguides of the arrays 502 to 50N.

Adjusting the height of the bottom part of the waveguide 501 allows the wavelength of the wave guided inside this waveguide to be varied, and therefore the beam of the RF antenna to be oriented in a plane Oxz orthogonal to the axis Oy.

Figure 6A:
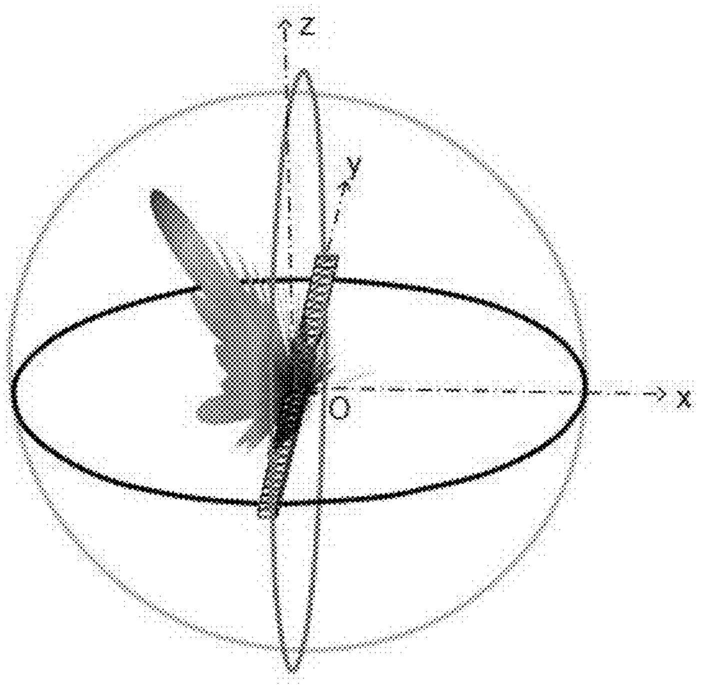
FIG. 6*a* shows the radiation pattern obtained with a 2D directional RF antenna according to one embodiment of the invention, for a given phase shift.
Figure 6B:
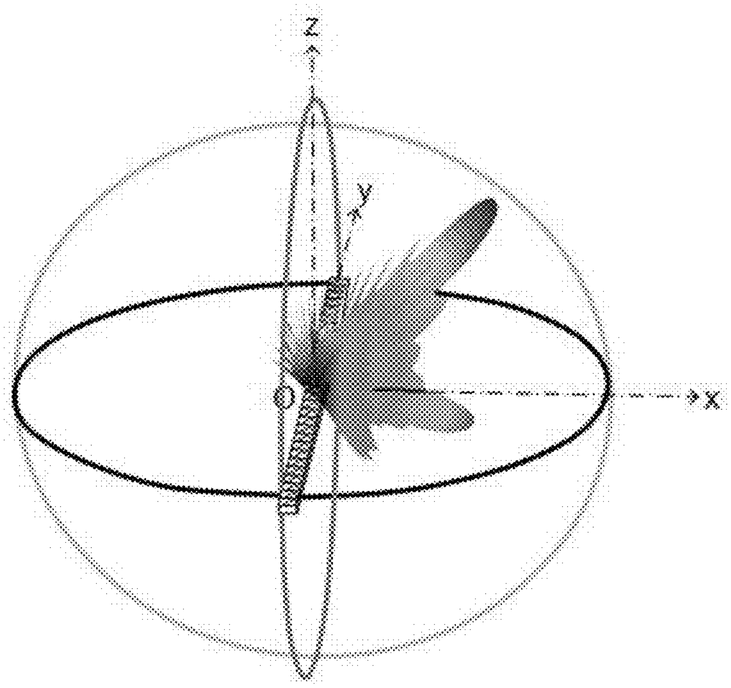
FIG. 6*b* shows the radiation pattern obtained with the same 2D directional RF antenna as in FIG. 6*a*, for another phase shift.

FIGS. 6*a* and 6*b* show radiation patterns obtained with a 2D directional antenna array according to one embodiment of the invention. In these figures, which are given by way of example, the antenna array shown resembles that of FIGS. 3*a* and 3*b*; however, the simulations that allowed the radiation pattern to be generated were carried out based on a 2D antenna array with N=9 antenna arrays arranged as in FIGS. 5*a* and 5*b*.

The wavelength guided by the antenna array 501 in FIG. 6*a* is different from the wavelength guided in FIG. 6*b*, as a result of translation of the moveable bottom part of the waveguide 501. It may be seen that insertion of a plurality of waveguides 503 to 50N in parallel and of the array 501 has modified the beam of the antenna, so that the radiation pattern of the 1D antenna, which has a wide main lobe (about 180°) in the plane Oxz, has become very directional, and therefore has a much higher gain. In may also be seen, by comparing FIGS. 6*a* and 6*b*, that the beam may be directed in the plane Oxz, by adjusting the height of the bottom wall of the antenna array 501. Furthermore, the pointing direction may also be modified in the plane Oyz by translating the bottom part of the waveguides 502 to 50N.

In another embodiment (not shown), the directional radio-frequency antenna comprises N directional antenna arrays according to the invention, with N higher than or equal to 2, said antennas being arranged in parallel and aligned directions, just like the guides 502 to 50N of FIG. 5*a*. The bottom parts of these guides are adjusted similarly, so that at any given time, the guided wavelength is the same in all the waveguides. The guides are fed by the same signal phase-wise. Such a device forms a directional RF antenna the beam of which is orientable in the plane Oyz, just as with the array of FIG. 1*a*, but differs therefrom in that the main lobe of the radiation pattern of this antenna is narrow (and therefore possesses a higher gain) in the plane Oxz.

The antenna arrays according to the invention, which are produced from waveguides having a translationally moveable bottom part allowing the height of the waveguide cavity through which are transported the electromagnetic waves to be modified, therefore allow directional RF antennas to be obtained that are orientable in one or two dimensions, with no mechanical action excepting the presence of a motor allowing the bottom wall to be modified, and without active elements (phase shifters). They therefore solve the stated technical problem.

The invention relates to an antenna array comprising a waveguide with a moveable bottom part and radiating elements and to a directional radio-frequency antenna implementing one or more of the antenna arrays according to the invention. It also relates to a method for configuring the pointing direction of a directional radio-frequency antenna based on antenna arrays according to the invention.

Figure 7:
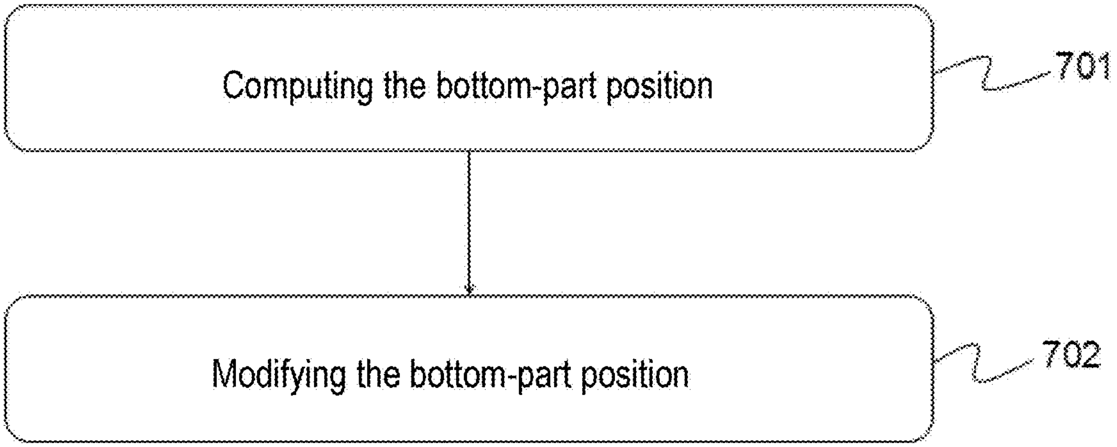
FIG. 7 schematically illustrates the steps of a method for configuring the pointing direction of a directional radio-frequency antenna based on antenna arrays according to the invention.

This method is schematically illustrated in FIG. 7. It is implemented on a directional radio-frequency antenna comprising one or more antenna arrays according to the invention, and comprises:

- a first step 701 of computing the position of the bottom parts of the waveguides of the one or more antenna arrays of the directional radio-frequency antenna. This step consists in computing one bottom-part position in the case of a 1D antenna, and two positions (one position for the aligned guides 502 to 50N and one position for the isolated guide 501) in the case of a 2D antenna. The positions are obtained considering the sought-after pointing direction, and the number, position and spacing of the radiating elements on the waveguides;
- a second step 702 of modifying the position of the bottom parts of the waveguides of the one or more directional antenna arrays. This step is carried out by actuating the adjusting means (motors) linked to the bottom parts of the waveguides of the one or more antenna arrays, so that they are positioned as computed in the first step.

Lastly, the invention also relates to a computer program product comprising program-code instructions for executing the steps of the method described above when said program is executed on a computer, or on any other computing means such as a microprocessor, a digital signal processor (DSP), a field-programmable gate array (FPGA), an application-specific integrated circuit (ASIC), any association of these means, or any hardware component allowing the steps of the method for configuring the pointing direction of a directional radio-frequency antenna based on antenna arrays according to the invention to be executed, and the adjusting means to be provided with settings relative to the adjustment of the position of the bottom parts of the waveguides.

The invention claimed is:

1. A directional antenna array, comprising:

a rectangular waveguide with two feeds, the guide extending along a longitudinal axis (Oy), said rectangular waveguide comprising:

a fixed portion with two lateral faces facing each other and an upper face joining the two lateral faces orthogonally, and a bottom part placed between the two lateral faces and forming the lower face of the waveguide;

a plurality of radiating elements placed regularly along said longitudinal axis on the fixed portion of the waveguide, wherein the bottom part of the rectangular waveguide is movable translationally in a direction of movement (Oz) parallel to the lateral faces, the maximum distance (H) between the bottom part and the upper face being smaller than the distance (L) between the lateral faces.

2. The directional antenna array according to claim 1, wherein the bottom part comprises a core extending along the longitudinal axis (Oy), the bottom part further comprising at least a first row of bars respectively extending from the core in a direction (Ox) perpendicular to the longitudinal axis (Oy) and to the direction of movement of the bottom part (Oz).

3. The directional radio-frequency antenna, comprising:

N directional antenna arrays according to claim 1, with N higher than or equal to 1, means for adjusting the position of the bottom part of the N directional antenna arrays, configured to adjust the position of the bottom part of the N waveguides depending on a sought-after antenna-beam direction.

4. The directional radio-frequency antenna according to claim 3, comprising N identical directional antenna arrays placed in parallel and aligned directions, wherein adjustment of the position of the bottom part of the waveguides of the N antenna arrays allows the beam of the antenna to be oriented in a plane (Oyz) comprising said longitudinal axis (Oy) and an axis (Oz) perpendicular to the longitudinal axis and parallel to the lateral faces of the one or more waveguides of the directional antenna array.

5. The directional radio-frequency antenna according to claim 3, with N higher than or equal to three, comprising N−1 identical directional antenna arrays placed in parallel and aligned directions, and a separate directional antenna array configured so that its radiating elements radiate into feeds of said N−1 directional antenna arrays.

6. The directional radio-frequency antenna according to claim 5, wherein:

the separation (H) between the upper face and the bottom part of the waveguides of the N−1 directional antenna arrays is the same for each of these waveguides, and adjustment of the position of the bottom parts of the waveguides of the N−1 directional antenna arrays allows the beam of the antenna to be oriented in a plane (Oyz) comprising an axis (Oy) parallel to the longitudinal axis of the N−1 directional antenna arrays, and an axis (Oz) perpendicular to these longitudinal axes and parallel to the lateral faces of the waveguides of the N−1 directional antenna arrays;

the position of the bottom part of the waveguide of the separate directional antenna array allows the beam of the antenna to be oriented in a plane (Oxz) orthogonal to the longitudinal axis (Oy) of the N−1 directional antenna arrays.

7. A method for configuring the pointing direction of a directional radio-frequency antenna, said radio-frequency antenna comprising:

N directional antenna arrays according to claim 1, with N higher than or equal to 1, means for adjusting the position of the bottom part of the N directional antenna arrays, configured to adjust the position of the bottom part of the N waveguides depending on a sought-after antenna-beam direction, the method comprising:

a step of computing the position of the bottom parts of the waveguides of the one or more directional antenna arrays of the directional radio-frequency antenna, and a step of modifying the position of the bottom parts of the waveguides of the one or more directional antenna arrays as computed in the first step.

8. A computer program product comprising program-code instructions for executing the steps of the method according to claim 7 when said program is executed on a computer.

* * * * *